(12) United States Patent
Li

(10) Patent No.: US 8,411,429 B2
(45) Date of Patent: Apr. 2, 2013

(54) MOUNTING APPARATUS FOR DISK DRIVE

(75) Inventor: Zhan-Yang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 496 days.

(21) Appl. No.: 12/713,457

(22) Filed: Feb. 26, 2010

(65) Prior Publication Data

US 2011/0090639 A1  Apr. 21, 2011

(30) Foreign Application Priority Data

Oct. 20, 2009 (CN) ...................... 2009 2 0312830 U

(51) Int. Cl.
*H05K 5/00* (2006.01)
*H05K 7/00* (2006.01)
(52) U.S. Cl. ......... 361/679.33; 361/679.37; 361/679.38; 361/679.39
(58) Field of Classification Search ............. 361/679.33, 361/679.37, 679.38, 679.39
See application file for complete search history.

(56) References Cited

U.S. PATENT DOCUMENTS

| 6,798,650 B2 * | 9/2004 | Reznikov et al. | 361/679.33 |
| 6,804,111 B1 * | 10/2004 | Williams et al. | 361/679.33 |
| 6,952,341 B2 * | 10/2005 | Hidaka et al. | 361/679.32 |

* cited by examiner

*Primary Examiner* — Anthony Haughton
(74) *Attorney, Agent, or Firm* — Altis Law Group, Inc.

(57) ABSTRACT

A mounting apparatus includes a chassis, a bracket, a handle, and a sliding component. The bracket is attachable to the chassis and configured to receive a disk drive. The securing component is secured to the bracket. The handle is secured to the securing component, and a latch portion extends from the handle. The handle is rotatable relative to the securing component between an open position where the latch portion is out of the securing component, and a close position where the latch portion is in the securing component. The sliding component is secured to the bracket, and slidable on the securing component between a first position, where the latch portion is engageable with the latch portion, and a second position, where the latch portion is prevented from disengaging from the sliding component.

20 Claims, 6 Drawing Sheets

MOUNTING APPARATUS FOR DISK DRIVE

BACKGROUND

1. Technical Field

The present disclosure relates to a mounting apparatus for disk drives.

2. Description of Related Art

Disk drives are received in a bracket. A mounting component is secured to the bracket, and a handle is secured to the mounting component which secures the bracket in a chassis of the server. Normally, the handle is secured to the mounting component. When pressed and then released, the handle is disengaged from the mounting component to free the bracket from the chassis. In the event the handle is pressed and then released carelessly while the disk drive is in use, secured contact is lost.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
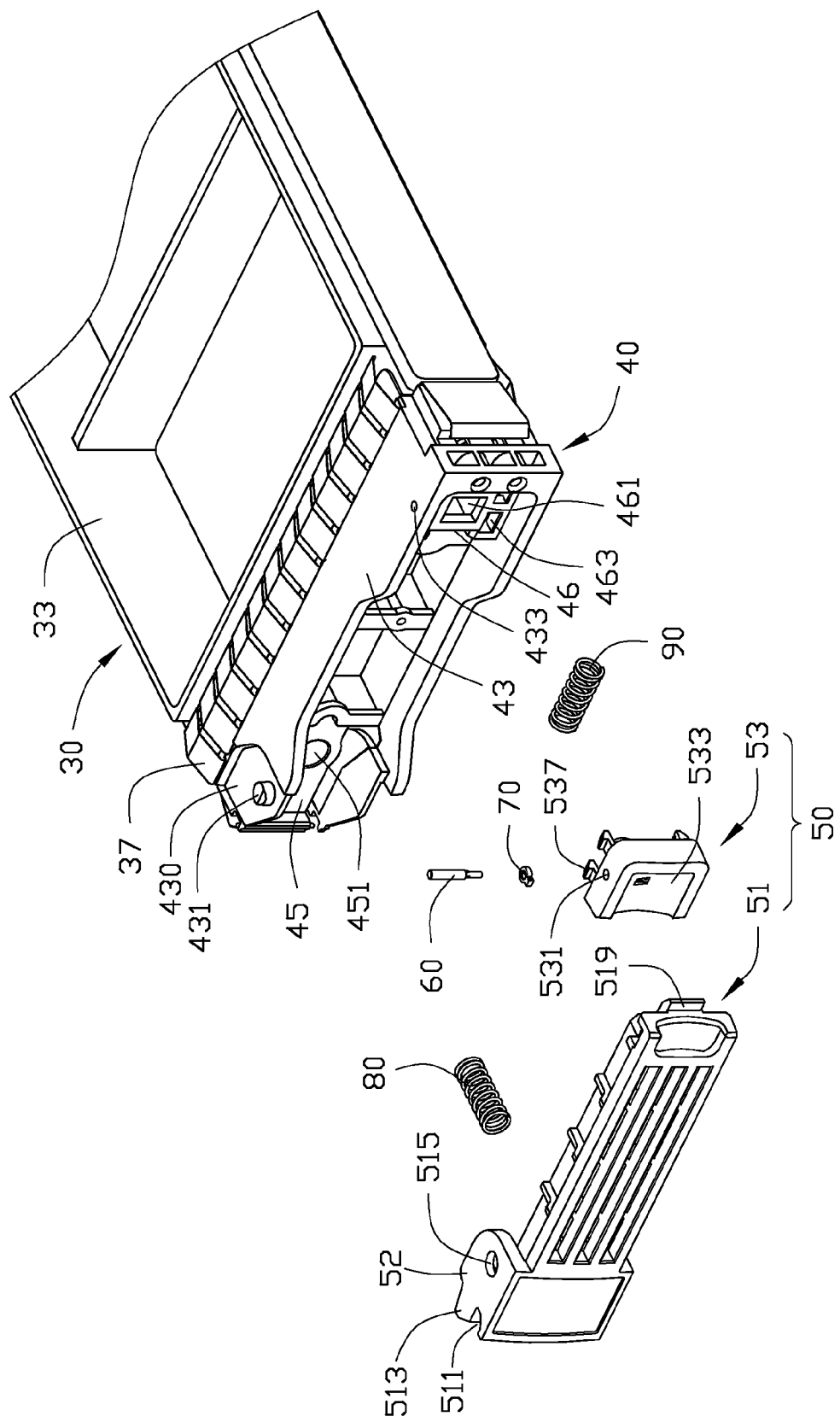
FIG. 1 is a partially exploded, isometric view of a mounting apparatus in accordance with an exemplary embodiment.
Figure 2:
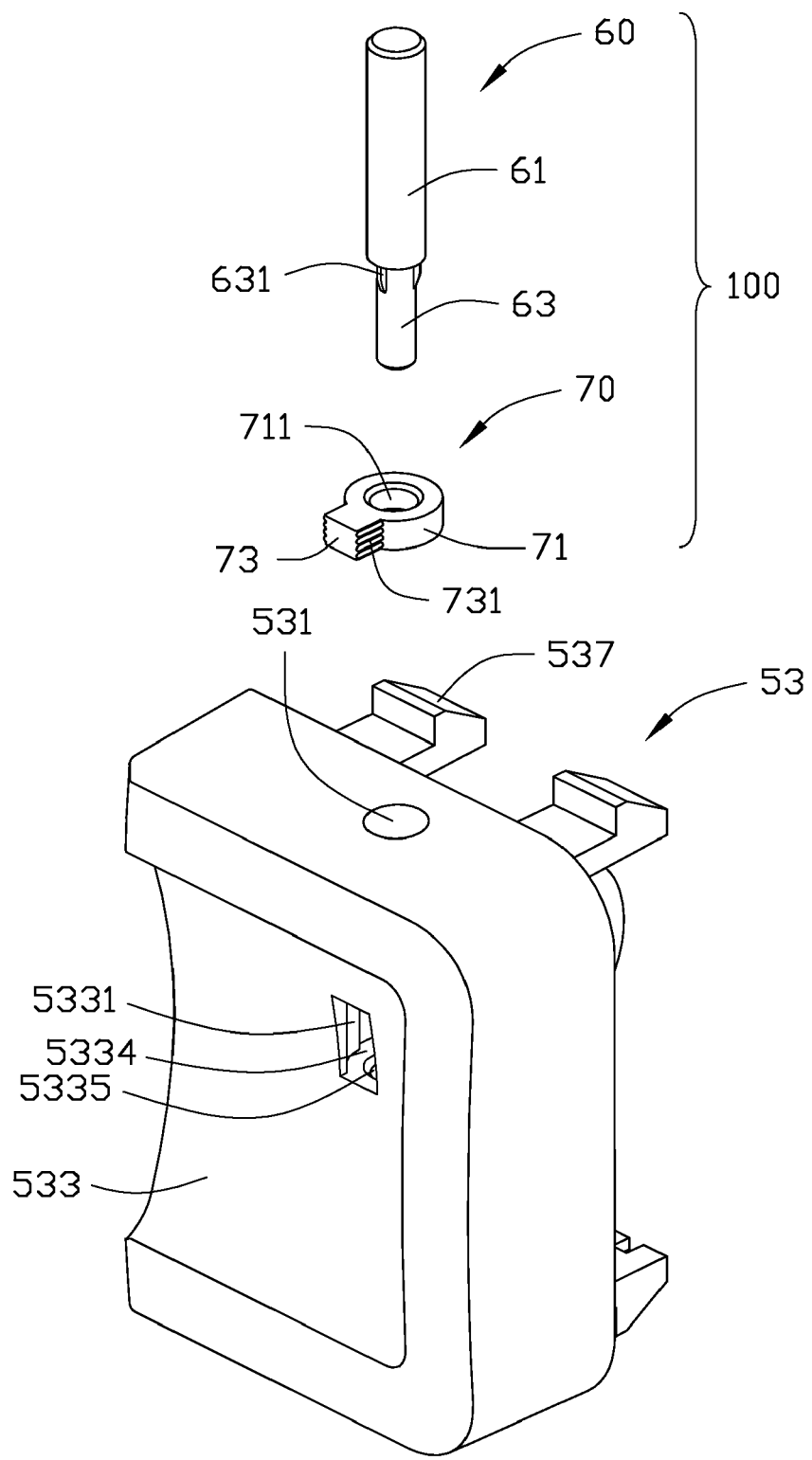
FIG. 2 is an exploded, isometric view of an operating mechanism and sliding component of an exemplary embodiment of the mounting apparatus of FIG. 1.
Figure 6:
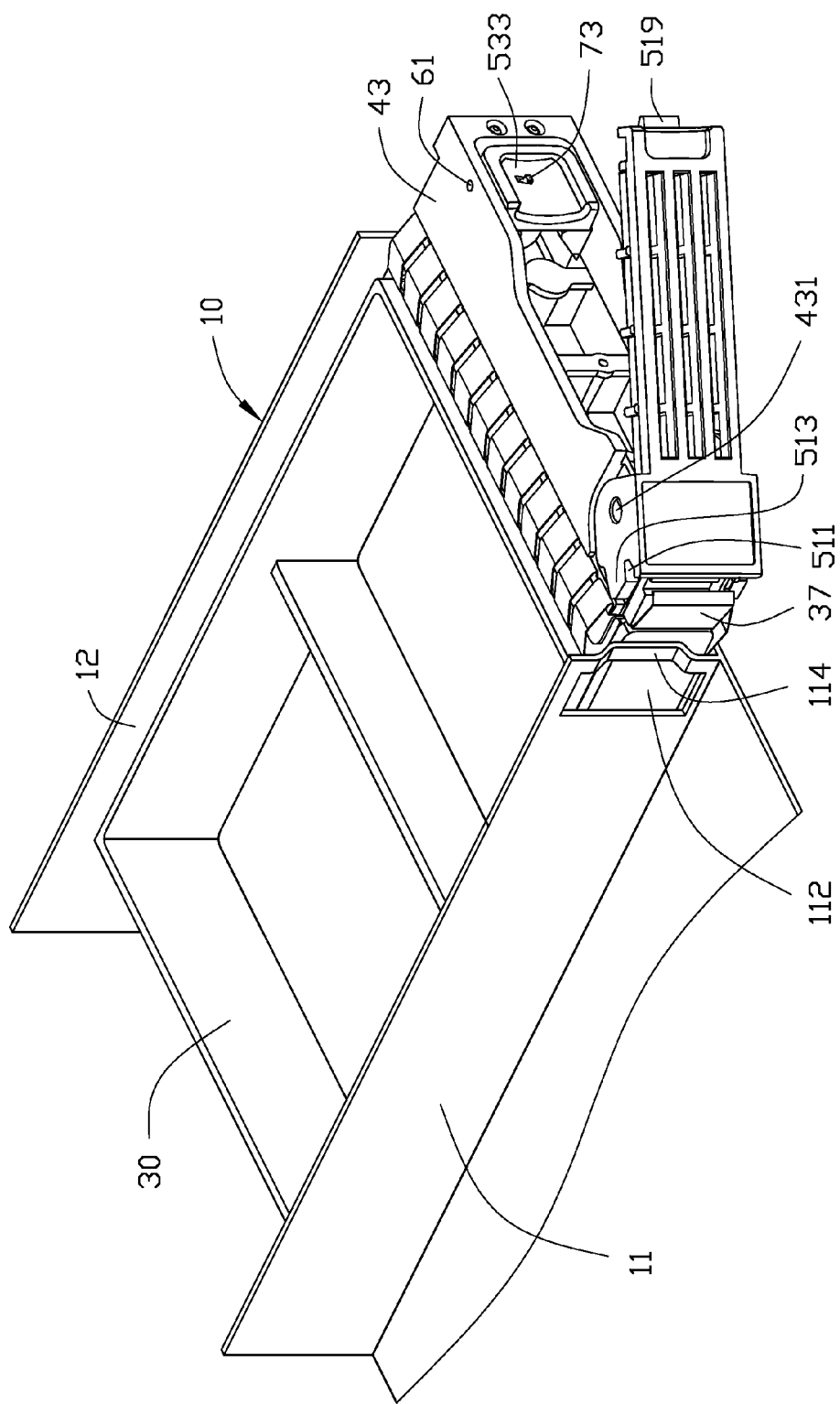
FIG. 6 is similar to FIG. 4, but showing the mounting apparatus of FIG. 4 secured in a chassis and the handle positioned in an open position.

Referring to FIGS. 1, 2 and 6, a mounting apparatus is provided for securing a disk drive (not shown) to a chassis 10. The mounting apparatus includes a bracket 30, a securing component 40, an operating mechanism 50, and a latch mechanism 100.

Referring also to FIG. 6, the chassis 10 includes a first sidewall 11 and a second sidewall 12. In one exemplary embodiment, the first sidewall 11 is substantially parallel to the second sidewall 12. The first sidewall 11 defines a fastener opening 112, and a strip 114 is formed on the first sidewall 11 adjacent the fastener opening 112.

The bracket 30 is configured for receiving a disk drive and defines a space 33 for receiving the disk drive. An electromagnetic interference (EMI) shielding component 37 is secured to the bracket 30.

Figure 3:
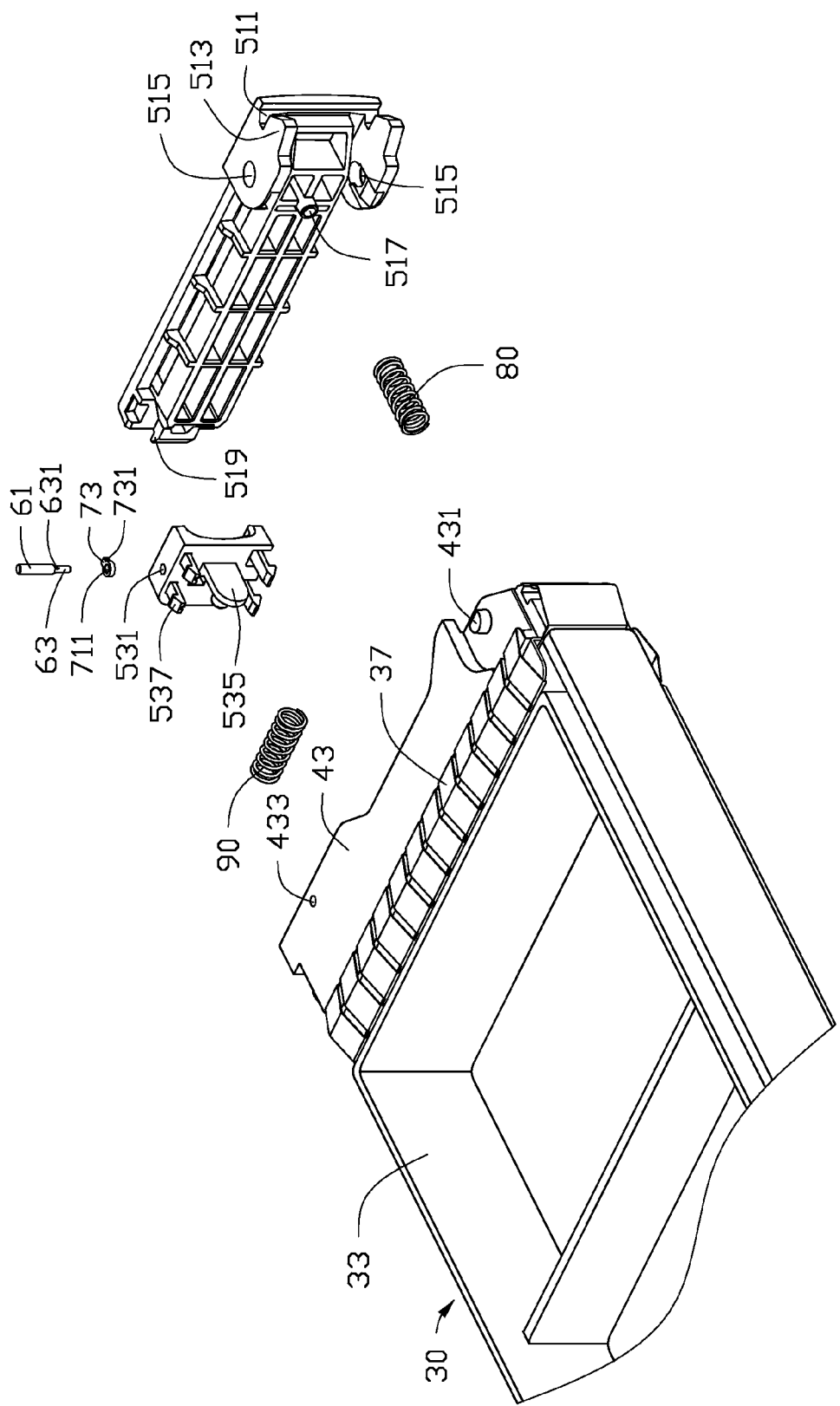
FIG. 3 is similar to FIG. 1, but shown in a different aspect.
Figure 5:
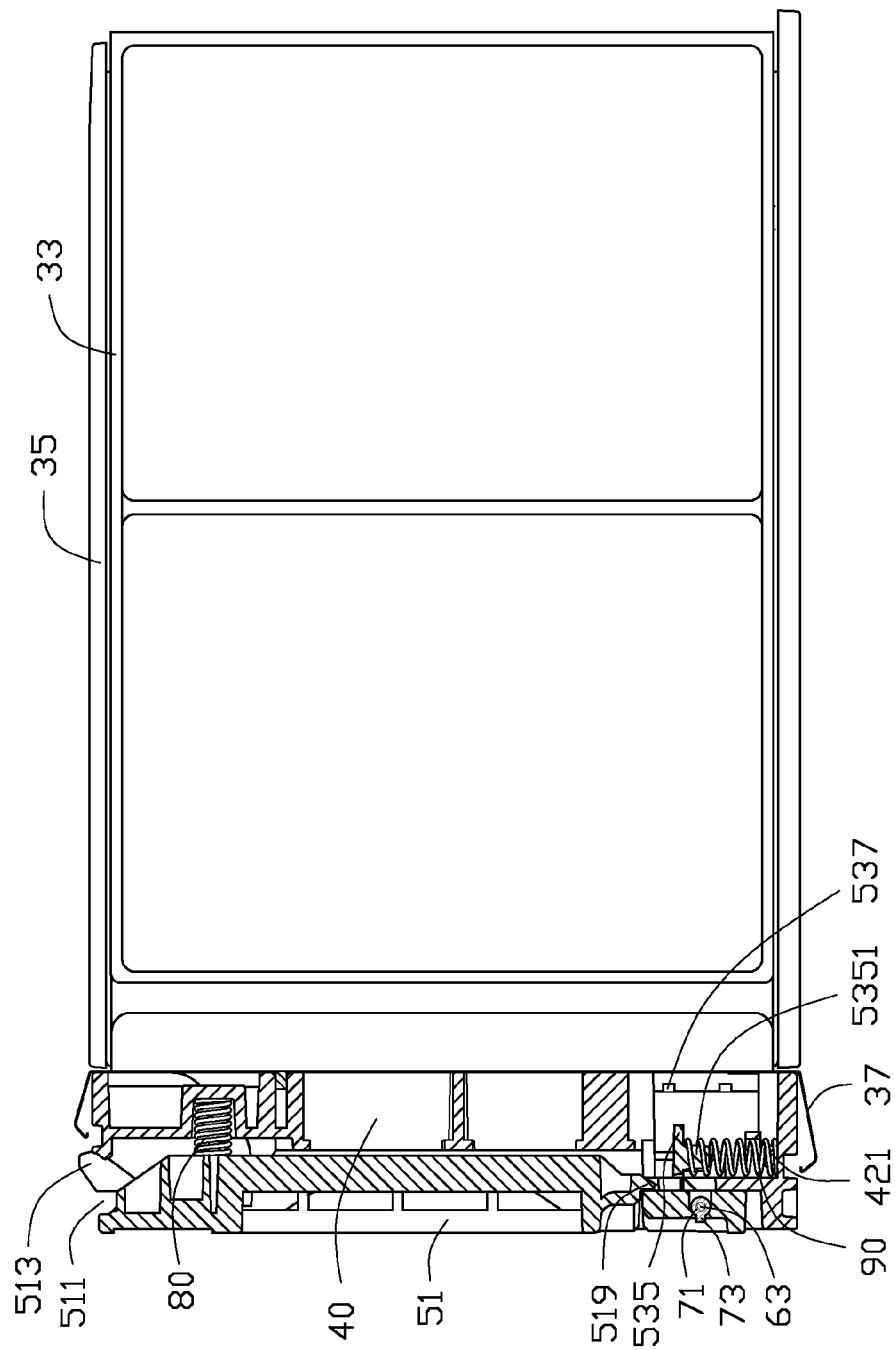
FIG. 5 is a cross-section view of the mounting apparatus of FIG. 4.

Referring to FIGS. 2-3, the securing component 40 is attached to the bracket 30 and includes two retaining walls 43. In one exemplary embodiment, the retaining walls 43 are substantially parallel to each other. A concave portion 430 is located on each retaining wall 43. A pivot post 431 is located on each concave portion 430. A first end portion 45 is located between the concave portions 430. A receiving slot 451 is defined in the first end portion 45. A through hole 433 is defined in one retaining wall 43. A second end portion 46 is located between the retaining wall 43. A first sliding slot 461 and a plurality of second sliding slots 463 are defined in the second end portion 46. Referring to FIG. 5, a positioning post 421 is located on the securing component 40 at one side of the second end portion 46. In one exemplary embodiment, the positioning post 421 extends in a first direction, which is substantially parallel to the retaining walls 43.

The operating mechanism 50 includes a handle 51 and a sliding component 53.

Two convex portions 52 are located on the handle 51 for engaging with the concave portions 430 of the bracket 40. A pivot hole 515 is defined in each convex portion 52 for receiving the pivot post 431 of the bracket 40. A cutout 511 is defined in each convex portion 52, and a locking protrusion 513 is located on each convex portion 52. A retaining post 517 is located on one side of the handle 51. A latch portion 519 with a slanted surface is located on the handle 51, and the slanted surface faces the securing component 40.

A recess 533 is defined in the sliding component 53, and a plurality of hooks 537 is located on the sliding component 53. A through opening 5331 is defined in the recess 533. A blocking tab 5334 with a receiving hole 5335 extends from an edge of the through opening 5331. A positioning block 535 is located on the sliding component 53, and a positioning tab 5351 (shown in FIG. 5) is located on the sliding component 53. A holding hole 531 is defined in the sliding component 53 at a top end. In one exemplary embodiment, the positioning tab 5351 extends in a second direction, which is substantially parallel to the retaining walls 43 of the securing component 40.

The latch mechanism 100 includes a latch post 60 and a pusher 70. The latch post 60 includes a first portion 61 and a second portion 63, that is smaller than the first portion 61. In one exemplary embodiment, the first portion 61 and the second portion 63 are cylinder, and a diameter of the first portion 61 is greater than a diameter of the second portion 63. A plurality of ribs 631 is located on the second portion 63 and is connected the first portion 61. The pusher 70 includes a main body 71 and a grip portion 73. The main body 71 defines a through hole 711, which has a size smaller than the size of the first portion 61 of the latch post 60, but greater than the size of the second portion 63. In one exemplary embodiment, the through hole 711 is circular, and has a diameter smaller than the diameter of the first portion 61, but greater than the diameter of the second portion 63. The main body 71 can be secured to the latch post 70 substantially adjacent to the first portion 61, by the ribs 631 are securely received in the through hole 711. The grip portion 73 of the pusher 70 has veins 731 at two sides for easily gripping the grip portion 73 of the pusher 70.

Figure 4:
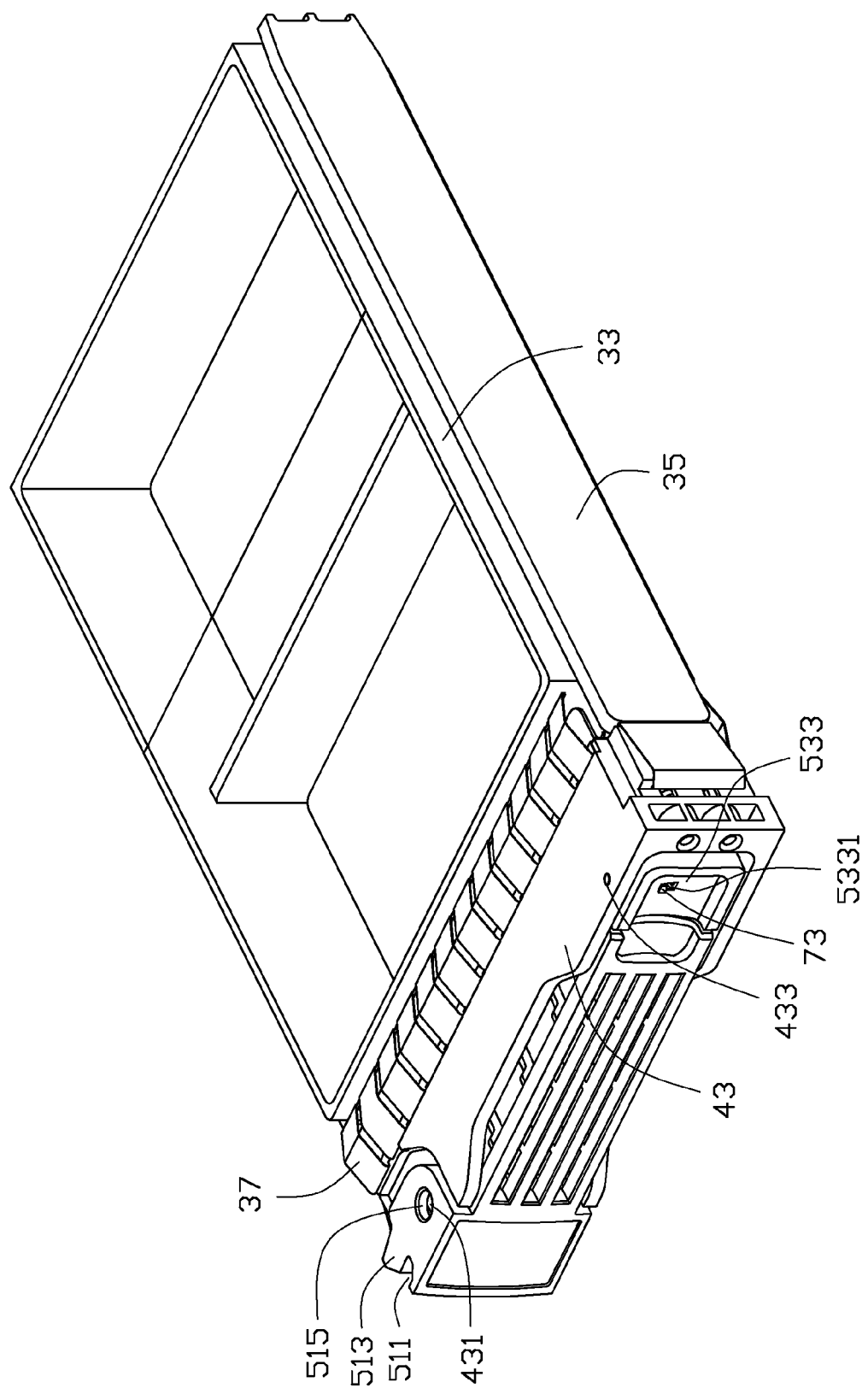
FIG. 4 is an assembled view of the mounting apparatus in accordance with an exemplary embodiment, and showing a handle in a close position.

Referring also to FIGS. 4-5, in assembly, the securing component 40 is secured to the bracket 30 with fasteners, such as screws of bolts. The EMI shielding component 37 is secured between the bracket 30 and the securing component 40. The pivot posts 431 of the securing component 40 is inserted in the pivot holes 515 of the handle 51, and the convex portions 52 are engaged with the concave portions 430. The handle 51 is therefore rotatable about the pivot posts 431 of the securing component 40. A first spring 80 is secured between the handle 51 and the securing component 40. One end of the first spring 80 is received in the receiving slot 451 of the securing component 40, and the other end thereof is mounted on the retaining post 517 of the handle 51.

The latch post 60 is inserted in holding hole 531. The first portion 61 of the latch post 60 is engaged in the through hole 711 of the pusher 70, and then it is inserted in the receiving hole 5335 of the blocking tab 5334 of the sliding component 53. The latch post 60 is therefore secured to the sliding component 53. In one exemplary embodiment, the latch post 60 is positioned in a vertical position.

The positioning block 535 and the first hooks 537 are slidably engaged in the first sliding slot 461 and the second sliding slots 463. Therefore, the sliding component 53 is slidable on the second end portion 46. A second spring 90 is secured between the positioning block 535 and the securing component 40. One end of the second spring 90 is mounted on the positioning tab 5351 of the positioning block 535, and the other end thereof is mounted on the positioning post 421 of the securing component 40.

The sliding component 53 is slidable between a first position and a second position. In the first position, the second spring 90 is resiliently deformed and urges the positioning block 535 and the first hooks 537 to adjoin the edges of the first sliding slot 461 and the second sliding slots 463. The first portion 61 of the latch post 60 correspond to the through hole 433 of the securing component 40. In the second position, the second spring 90 is further resiliently deformed, and the positioning block 535 and the first hooks 537 slide away from the edges of the first sliding slot 461 and the second sliding slots 463. In one exemplary embodiment, the latch post 60 is substantially perpendicular to the retaining walls 43.

Referring also to FIGS. 4-6, in use, the handle 51 is rotatable between an open position (shown in FIG. 6) and a close position (shown in FIGS. 4-5) about the pivot posts 431 of the securing component 40. In the open position, the latch portion 519 is disengaged away from the sliding component 53, the first spring 80 is in an original state, and the handle 51 is rotated away from the securing component 40. In the close position, the latch portion 519 is engaged with the sliding component 53, and the first spring 80 is resiliently deformed.

When the handle 51 is rotated from the open position to the close position, the slanted surface of the latch portion 519 presses and slides the sliding component 53 from the first position to the second position. The first spring 80 is resiliently deformed. When the sliding component 53 is in the second position, the latch portion 519 can pass across the sliding component 53. The second spring 90 rebounds to slide the sliding component 53 from the second position to the first position, to engage the sliding component 53 with the latch portion 519. The handle 51 is therefore positioned in the close position.

To release the handle 51 from the sliding component 53, the sliding component 53 is slid from the first position to the second position, to disengage the latch portion 519 from the sliding component 53. The first spring 80 rebounds to rotate the handle 51 away from the securing component 40.

When the sliding component 53 is in the first position, the latch post 60 corresponds to the through hole 433 of the securing component 40. The latch post 60 is slid by the grip portion 73 of the pusher 70, to insert the first portion 61 of the latch post 60 in the through hole 433 of the securing component 40. The sliding component 53 is thereby prevented from sliding from the first position to the second position. When sliding of the sliding component 53 is desired, the latch post 60 is slid by the grip portion 73 of the pusher 70 to disengage the first portion 61 from the through hole 433.

In one exemplary embodiment, since the size, such as the diameter of the through hole 433 of the securing component 40 is slightly smaller than the size, such as the diameter of the first portion 61 of the latch post 60, the first portion 61 can be securely engaged in the through hole 433 of the securing component 40. The first portion 61 cannot disengaged from the through hole 433 without a predetermined force applied to the grip portion 73 of the grip portion 73 of the pusher 70.

In assembling the bracket 30 to the chassis 10, the handle 51 is positioned in the open position. The bracket 30 is inserted in a space between the first sidewall 11 and the second sidewall 12 of the chassis 10. When the locking protrusion 513 of the handle 51 corresponds to the fastener opening 112, the handle 51 is rotated from the open position to the close position. The locking protrusion 513 is engaged in the fastener opening 112, and the strip 114 is received in the cutout 511 of the handle 51. Therefore, the bracket 30 is secured in the chassis 10.

In disassembly of the bracket 30, the handle 51 is rotated from the close position to the open position. The locking protrusion 513 is disengaged from the fastener opening 112, and the strip 114 is disengaged from the cutout 511 of the handle 51. The bracket 30 can be thus removed out from the chassis 10.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus comprising:
a chassis;
a bracket attachable to the chassis and configured for receiving a disk drive;
a securing component secured to the bracket and defining a through hole;
a handle secured to the securing component, a latch portion extending from the handle, the handle being rotatable relative to the securing component between an open position, where the latch portion is out of the securing component, and a close position, where the latch portion is in the securing component;
a sliding component secured to the bracket, the sliding component being slidable on the securing component between a first position, where the latch portion is engaged with the sliding component, and a second position, where the latch portion is disengaged from the sliding component; and
a latch mechanism attached to the sliding component and engaging with the through hole, to block the sliding component from sliding relative to the securing component; and the latching mechanism is slidable relative to the securing component to disengage from the though hole, to allow the sliding component to side sliding relative to the securing component.

2. The mounting apparatus of claim 1, wherein a first spring is positioned between the handle and the securing member and biases the handle from the close position to the open position.

3. The mounting apparatus of claim 2, wherein a retaining post is located on the handle; the securing component defines a receiving slot; and one end of the first spring is mounted on the retaining post; and the other end of the first spring is engaged in the receiving slot.

4. The mounting apparatus of claim 1, wherein a second spring is positioned between the sliding component and the securing component and biases the sliding component from the second position to the first position.

5. The mounting apparatus of claim 4, wherein a positioning block is located on the sliding component; a positioning post is located on the securing component; and one end of the second spring is mounted on the positioning block, and the other end of the second spring is mounted on the positioning post.

6. The mounting apparatus of claim 1, wherein the securing component defines a first sliding slot and a second sliding slot, and the sliding component comprises a hook; the positioning block is slidably received in the first sliding slot, and the hook is slidably received in the second sliding slot.

7. The mounting apparatus of claim 1, wherein the latch mechanism comprises a latch post is engaged in the through hole.

8. The mounting apparatus of claim 7, wherein the through hole has a diameter slightly smaller than a diameter of the latch post.

9. The mounting apparatus of claim 7, wherein the latch mechanism further comprises a pusher secured to the latch post; and the sliding component defines a through opening for the pusher exposed out of the sliding component.

10. The mounting apparatus of claim 9, wherein the sliding component defines a holding hole; a blocking tab with a receiving hole is located on the sliding component; and the latch post is slidably engaged in the holding hole and the receiving hole.

11. A mounting apparatus comprising:
a bracket configured for receiving a disk drive;
a securing component secured to the bracket;
a handle rotatably secured to the securing component;
a sliding component secured to the bracket, the sliding component being slidable on the securing component between a first position, where the latch portion is engageable with the handle, and a second position, where the latch portion is away from the handle; and
a latch mechanism secured to the sliding component and slidable between an unlocked position, where the latch mechanism disengages from the securing component so that the sliding component is slidable on the sliding component, and a locked position, where the latch mechanism engages with the securing component so that the sliding component is blocked from sliding by the operating mechanism.

12. The mounting apparatus of claim 11, wherein a handle is rotatable relative to the securing component between an open position, where the handle is away from the sliding component, and a close position, where the handle is engaged with the sliding component.

13. The mounting apparatus of claim 12, wherein a latch portion with a slanted surface is located on the handle; and the latch portion is away from the sliding component when the handle is in the open position, and engaged with the sliding component when the handle is in the close position.

14. The mounting apparatus of claim 12, wherein a first spring is positioned between the handle and the securing member and biases the handle from the close position to the open position.

15. The mounting apparatus of claim 14, wherein a retaining post is located on the handle; the securing component defines a receiving slot; and one end of the first spring is mounted on the retaining post; and the other end of the first spring is engaged in the receiving slot.

16. The mounting apparatus of claim 11, wherein a second spring is positioned between the sliding component and the securing component and biases the sliding component from the second position to the first position.

17. The mounting apparatus of claim 16, wherein a positioning block is located on the sliding component; a positioning post is located on the securing component; and one end of the second spring is mounted on the positioning block, and the other end of the second spring is mounted on the positioning post.

18. The mounting apparatus of claim 11, wherein the securing component defines a through hole; and the latch mechanism comprises a latch post is engageable in the through hole.

19. The mounting apparatus of claim 18, wherein the through hole has a diameter slightly smaller than a diameter of the latch post.

20. The mounting apparatus of claim 18, wherein the latch mechanism further comprises a pusher secured to the latch post; and the sliding component defines a through opening for the pusher exposed out of the sliding component.

* * * * *